Patented Nov. 29, 1927.

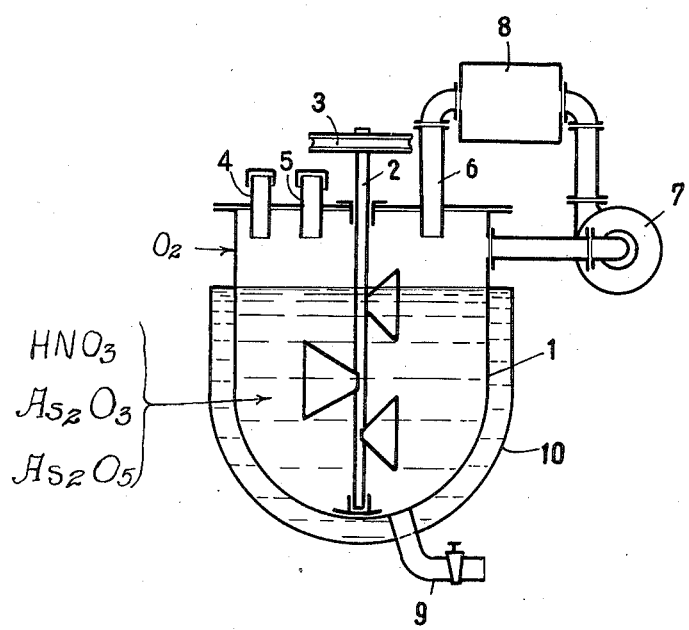

UNITED STATES PATENT OFFICE.

PAUL ASKENASY AND EGON ELÖD, OF KARLSRUHE, BADEN, GERMANY.

PRODUCTION OF ARSENIC ACID AND ITS SOLUTIONS.

Application filed January 29, 1925, Serial No. 5,655, and in Germany March 29, 1924.

This invention has reference to the oxidation of oxidizable substances by means of oxides of nitrogen, including particularly nitric acid and consists in treating oxidizable arsenic compounds with said oxides of nitrogen in the presence of oxygen under pressure and simultaneously catalytically increasing the rate of the reaction thereby produced. One of the particularly valuable results accomplished by such procedure is that the oxidizing reaction can be produced by a minimum of nitric acid or the like and that the nitric acid, after having been utilized in the oxidizing reaction, is regenerated or recovered during the reaction period within the reaction vessel.

Another important feature of this process consists in using catalytic action as a means of increasing the intensity of the transfer of oxygen whereby the velocity of the reaction, including both the oxidation of the oxidizable substance itself and the recovering of the nitric acid or other oxides of nitrogen is greatly increased. The catalytic influencing of the reaction can be accomplished not only by supplying catalysts which are different from the reagents concerned in the reaction but also by means of suitably selected oxidizable substances; such substances, if suitably selected, being either themselves adapted to produce the catalytic effect aimed at or being capable of producing such effect by the intermission of the reaction products formed therefrom by oxidation.

If it is intended to use catalysts different from the materials concerned in the oxidizing reaction, compounds of such metals are used with preference which are capable of more than two stages of oxidation and of these with particular advantage compounds of vanadium, cobalt, iron, manganese, molybdenum, chromium, and rare earths may be employed.

In order that our invention may be fully understood we shall describe it hereafter more in detail with reference to the accompanying drawing which shows an apparatus adapted for the execution thereof.

In the drawing 1 designates a pressure proof reaction vessel preferably made of an acid resisting metal or alloy and provided with a stirring device 2 carrying a belt-pulley 3 for its actuation. 4 designates a pipe for introducing gas containing oxygen and, if desired, oxides of nitrogen. The pipe 4 is shown as opening into the gas space of the reaction vessel; however, if desired, it may open below the level of the liquid. 5 designates an exit tube for gases or vapors, 6 is a circulating conduit including a fan 7. 8 is an absorption chamber inserted in the circulating tube 6. 9 is an exit pipe for liquid or viscid or muddy reaction products. 10 is a jacket containing oil, water or the like for controlling the temperature within the reaction vessel 1.

The operation is substantially as follows. The oxidizable substance is introduced into the reaction vessel 1, by opening the cover thereof or through tubes 4 or 5. Thereafter the oxides of nitrogen, preferably nitric acid, are added and, as the case may be, the catalytic substance. After the introduction of the non-gaseous reagents an atmosphere containing oxygen is formed above the reagents within the pressure chamber 1 and such atmosphere is submitted to pressure, which may be performed either by suitably compressing the gases introduced into the gas space by exterior compressing means or by heating the pressure chamber or by these two means combined.

During the reaction undesired gaseous products such as steam are liable to be formed which are apt to deteriorate the oxygen containing atmosphere within the pressure chamber. Such gaseous or vaporous products may be removed by circulating the gases which occupy the space above the liquid charge of the pressure chamber through conduit 6 and absorbing the undesired constituents thereof by suitable absorbents in absorbing vessel 8, such absorbents being for instance lime. If gases are formed which cannot be absorbed, it becomes necessary to remove such gases through tube 5. Conduit 6 may also be used to separate valuable reaction products which owing to their volatility enter into the gas space. In order to secure intimate contact between the several reagents the mass should be vigorously stirred by the agitator 2.

Reaction products may be discharged through tube 9 and through the same tube nitric acid or other reagents necessary in the process may be introduced. The introduction of concentrated nitric acid or oxides of nitrogen during the process may be advisable, if in the reaction vessel a dilution of the nitric acid originally introduced takes place in pursuance of the reaction. In this case the introduction of gaseous oxides of nitrogen recommends itself for the reason that the introduction of this gas may be effected through tubes made from material which would not resist the action of the liquid nitric acid or of nitrous acid.

It may be pointed out in this connection that instead of nitric acid, oxides of nitrogen with oxygen and water or a mixture evolving nitric acid may be used, such nitric acid producing mixture being for instance of sodium nitrate and sulphuric acid.

The process is particularly adapted to transform arsenic trioxide into arsenic pentoxide. An example of this reaction is as follows:

The reaction vessel 1 is charged with 150 parts by weight of arsenic trioxide ($As_2O_3$) and 150 parts by weight of nitric acid of 60% concentration. If desired a small quantity of arsenic pentoxide or of another suitable catalyst may be added. Pure oxygen is introduced and maintained at a pressure of about 20 atmospheres and at a temperature of 70-90° C. The entire contents are vigorously stirred by the stirrer 2. By continuing the reaction for a sufficient length of time the arsenic trioxide is almost completely converted to the higher oxidation stage without any substantial quantity of arsenic trioxide remaining unconverted. The complete conversion under the conditions referred to will necessitate almost twelve to eighteen hours at the utmost. The nitric acid originally introduced in to the reaction vessel remains nearly completely unchanged and can be recovered by distillation under ordinary pressure or in vacuo with or without steam. Sometimes the reaction products on cooling separate into two layers of different specific gravity. The process may be continued by introducing fresh quantities of arsenic trioxide into the nitric acid containing a certain proportion of the arsenic pentoxide formed.

Of course owing to the presence of water in the acid solution the arsenic pentoxide is present in the reaction vessel in the form of a hydrate.

In this case the compounds of arsenic in the reaction vessel operate as catalyzing agents so that the addition of catalyzing substances other than the reagents themselves may be dispensed with.

The duration of the reaction largely depends from the intensity of stirring. Experience has shown that by very intense stirring the reaction period can be reduced to half an hour and even less.

The reaction vessel may consist of chromium-nickel steel, ferrosilicon or other metals or alloys or mineral compounds such as clay which are not attacked by nitric acid or arsenic oxides.

The aqueous solution of arsenic pentoxide which is formed can be transformed into calcium arsenate by neutralization with calcium hydroxide, this being a very cheap method of producing this compound which is very valuable as insecticide and as fungicide.

It appears from the given example that very small quantities of nitric acid are sufficient to produce the oxidation of considerable quantities of the arsenic compound for which much greater quantities of nitric acid were required by previous methods, there being the additional advantage according to the new method that substantially no nitric acid or the like is lost during the process.

Where the term "oxides of nitrogen" is used in the appended claims, we mean to comprise the hydrates thereof or in other words the acids directly derived from said oxides.

What we claim is:—

1. A method of oxidizing oxidizable arsenic compounds consisting in reacting thereon with oxides of nitrogen in the presence of oxygen under pressure.

2. A method of oxidizing oxidizable arsenic compounds consisting in reacting thereon with oxides of nitrogen comprising nitric acid, in the presence of oxygen under pressure.

3. A method of oxidizing oxidizable arsenic compounds consisting in reacting thereon with oxides of nitrogen in the presence of oxygen under pressure and maintaining the partial oxygen pressure substantially invariable during the reaction.

4. A method of oxidizing oxidizable arsenic compounds consisting in reacting thereon with oxides of nitrogen in the presence of oxygen under pressure within a pressure chamber containing a gas atmosphere comprising a high percentage of oxygen.

5. A method of oxidizing oxidizable arsenic compounds consisting in reacting thereon with oxides of nitrogen in the presence of oxygen under pressure within a pressure chamber containing a gas atmosphere and admitting fresh oxygen into said reaction chamber during the reaction.

6. A method of oxidizing oxidizable arsenic compounds consisting in reacting thereon with oxides of nitrogen in the presence of oxygen under pressure within a pressure chamber containing a gas atmosphere and admitting gaseous oxides of nitrogen into the reaction chamber during reaction.

7. A method of producing arsenic pentoxide which consists in treating arsenic trioxide with liquids containing nitric acid and with oxygen under pressure in a pressure chamber and separating the resulting arsenic pentoxide from the nitric acid containing liquid.

8. A method of producing arsenic pentoxide which consists in treating arsenic trioxide with liquids containing nitric acid in the presence of oxygen under pressure in a pressure chamber, maintaining an elevated temperature in said pressure chamber during the reaction and separating the resulting arsenic pentoxide from the nitric acid containing liquid.

In testimony whereof, we affix our signatures.

PROF. DR. PAUL ASKENASY.
PROF. DR. EGON ELÖD.